H. T. HENRY.
BUTTER-WORKER.
No. 173,951. Patented Feb. 22, 1876.
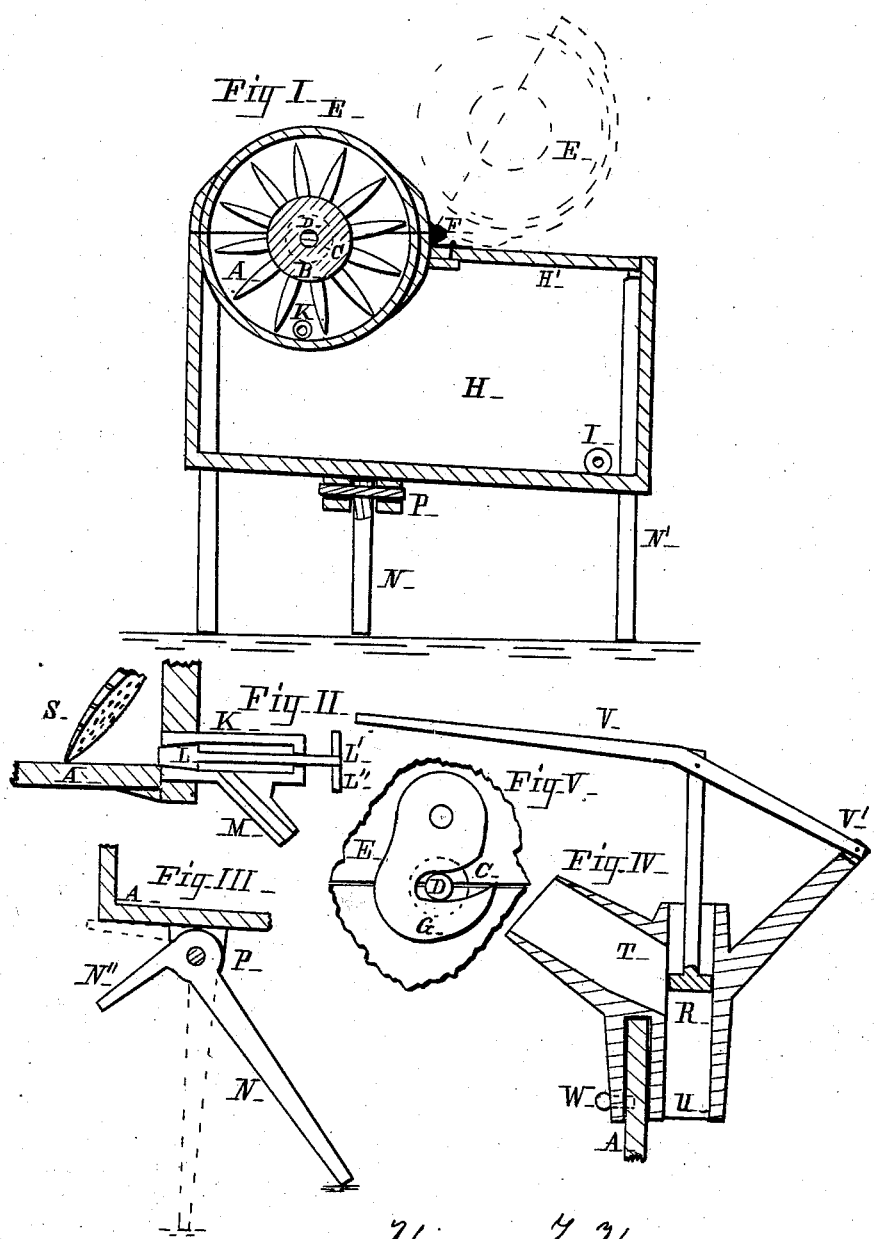

UNITED STATES PATENT OFFICE.

HORACE T. HENRY, OF TERRE BONNE PARISH, LOUISIANA.

IMPROVEMENT IN BUTTER-WORKERS.

Specification forming part of Letters Patent No. 173,951, dated February 22, 1876; application filed August 17, 1875.

*To all whom it may concern:*

Be it known that I, HORACE T. HENRY, of Terre Bonne parish, Louisiana, have invented a new and useful Improvement in Machines and Process for Working and Preparing Butter, substantially as set forth hereinafter, referring to the accompanying drawings, in which—

Figure 1 is a cross-section of apparatus. Figs. 2, 3, and 4 are details of parts of same.

This invention consists in an improved machine and process for working and reworking butter to purify and improve its quality and keeping properties.

The chamber A is cylindrical in form. It is suitably made, and is lined with sheet-zinc or other material which can be kept clean and tight, or may be formed of wood only. This chamber contains the cylinder B, having the wooden cutters C set around it in spiral form for operating on the butter in chamber A. This cylinder is turned by a crank at one end, and has bearings D in the ends of chamber A. The butter is placed in chamber A, and the cutters, set spirally, cut and mix it thoroughly, working it from end to end as the crank is turned first in one and then the other direction. The upper part of chamber A is formed by part E forming a lid and hinged to the lower portion at F. The bearings D are made in two portions, so that when part E is turned back the cylinder B may be taken out freely. The shaft of this cylinder is held to the top portion so as to be held and turned back with it by sliding catches G on the top portion, which are arranged so they may be turned to hold it, or turned to let it remain free. The top E turns back and lifts the cylinder B out of the butter, leaving the chamber free for receiving or removing the contents. Back of chamber A is chamber H, with a lid at the top to receive ice and cold or hot water for regulating the temperature of the butter in chamber A. The water from this passes under chamber A to regulate the temperature therein. This chamber H has a faucet, I, to let off the water. The chamber A has a faucet, K, to let off water from it. This is made with a sliding stopper, L, which fits into the opening from the chamber A, flush with the walls to prevent the butter getting into the opening.

This stopper L has a rod, L', extending back through the closed end of the faucet to bear the handle L'', to operate the stopper by. The opening in the end of the faucet is contracted so the stopper L may close it tightly, and become loose by being drawn back. The faucet has an outlet, M, downward, and the stopper is drawn back of this to open it.

The apparatus is mounted on fixed legs. At one end one or more additional legs, N, are pivoted to it at P, so that they may be turned back, inclined as shown, when the machine is at work, and allow it to stand level, and so that it may be drawn down vertical by lifting one end of the apparatus, as shown by dotted lines, and hold the apparatus inclined to one end to let the water run off through the faucet K.

The shovel S is made curved on the bottom to fit on the inside of chamber A for removing the butter. It has holes in the bottom for drainage, and is made and arranged with chamber A to cover the faucet K as a shield to keep back the butter when draining off the water.

The chamber T is mounted removably with a suitable holder and bearing on the end of chamber A. It is open at the top to receive the butter, and inclined so as to feed it into the vertical cylinder R into which it passes. This cylinder R has a plunger worked up and down in it from hand-lever V, pivoted at V', by which it is operated. This forces the butter into chamber A, down through a fine wire sieve in the lower end of cylinder R, which cuts it up finely preparatory to purifying, and separates all particles of solid matter. This may be omitted if the condition of the butter does not require it. The butter is put into chamber A with a quantity of water, and if the butter is not in a suitable and moderately soft state, the water is used warm or cold to produce the proper condition. When the proper consistency is reached, the lid E is securely closed, and the crank and central cylinder B are turned several times in each direction, reversing back and forth rapidly to wash the butter thoroughly throughout. This water is then removed by the faucet K, and a fresh quantity of water, salt, and the composition, hereafter named, is added, and the butter reworked. This may be done by turning five or six revolutions in one direction, and as many in the other, alternately, for half a dozen times. This finishes washing the butter, and fills it throughout with salt-brine in a fine spray or particles, to improve and preserve it.

The quantity of salt and the quantity and character of the composition used depend upon the condition of the butter and length of time it is designed to keep. If for immediate use, only enough salt may be used to leave it in a right condition for use; if to be kept long, a larger quantity of brine and salt is mingled through it in the process, and left in in taking out and packing, which can be worked out when unpacked for use by reworking or otherwise.

The composition used consists of white sugar, one hundred parts, sulphite of soda, three parts, oil of mustard, one part, together with a trace of coloring-matter, if needed, and sometimes other preservative substances, as desired. This composition may be omitted or varied, as preferred.

After the butter is worked enough, it is allowed to stand awhile to cool and harden by the action of the ice or cold water in chamber H. This chamber H may be made large enough for a regular storage-refrigerator for grocery or domestic use, or may be entirely omitted, as desired.

I claim—

1. The combination in a butter-worker, having the pivoted leg N, or means for holding it inclined, of the guard S to hold back the butter, and perforated to allow the water to percolate off, with the faucet K, substantially as set forth.

2. The butter-worker, with the hinged top, arranged to carry back and hold the working cylinder B, out of chamber A, substantially as set forth.

H. T. HENRY.

Witnesses:
SAML. J. WALLACE,
W. J. COCHRAN.